(12) United States Patent
Mizoguchi (10) Patent No.: US 11,953,406 B2
(45) Date of Patent: Apr. 9, 2024

(54) ACCURACY DIAGNOSTIC DEVICE AND ACCURACY DIAGNOSTIC METHOD FOR MACHINE TOOL, AND ACCURACY ADJUSTMENT RESERVATION SYSTEM

(71) Applicant: OKUMA CORPORATION, Niwa-Gun (JP)

(72) Inventor: Yuji Mizoguchi, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 105 days.

(21) Appl. No.: 17/659,868

(22) Filed: Apr. 20, 2022

(65) Prior Publication Data

US 2022/0341820 A1 Oct. 27, 2022

(30) Foreign Application Priority Data

Apr. 27, 2021 (JP) .................................. 2021-075250

(51) Int. Cl.
G06F 11/30 (2006.01)
G01M 99/00 (2011.01)

(52) U.S. Cl.
CPC ................................ *G01M 99/005* (2013.01)

(58) Field of Classification Search
CPC .................................................. G01M 99/005
See application file for complete search history.

(56) References Cited

FOREIGN PATENT DOCUMENTS

| JP | 2001205545 A | * | 7/2001 |
|----|--------------|---|--------|
| JP | 2019-136846 A | | 8/2019 |
| JP | 2019136846 A | * | 8/2019 |
| JP | 2020-085704 A | | 6/2020 |

* cited by examiner

*Primary Examiner* — Phuong Huynh
(74) *Attorney, Agent, or Firm* — BURR PATENT LAW, PLLC (57) ABSTRACT

An accuracy diagnostic device includes a change amount detecting unit, a change amount recording unit, an accuracy change predictor, and an accuracy adjustment timing presenting unit. The change amount detecting unit detects a magnitude of a change in at least one of a state of a machine tool and a surrounding environment of the machine tool as a change amount. The change amount recording unit records the change amount. The accuracy change predictor predicts a future accuracy change of the machine tool using the change amount recorded in the change amount recording unit. The accuracy adjustment timing presenting unit presents a timing at which an accuracy adjustment is to be required for the machine tool based on the accuracy change predicted by the accuracy change predictor.

8 Claims, 5 Drawing Sheets

ACCURACY DIAGNOSTIC DEVICE AND ACCURACY DIAGNOSTIC METHOD FOR MACHINE TOOL, AND ACCURACY ADJUSTMENT RESERVATION SYSTEM

This application claims the benefit of Japanese Patent Application Numbers 2021-075250 filed on Apr. 27, 2021, the entirety of which is incorporated by reference.

BACKGROUND

1. Technical Field

The disclosure relates to an accuracy diagnostic device and an accuracy diagnostic method for preliminarily determining a timing appropriate for executing an accuracy adjustment of a machine tool and a system for reserving an accuracy adjustment executing date and time at the timing determined by the accuracy diagnostic device.

2. Related Art

A machine tool has its accuracy changed over a long time with various factors, such as a temperature change in a plant, an abrasion of a mechanical component, and a deformation of a floor. In order to avoid a lowered machining accuracy, measurements and adjustments of accuracies have been periodically executed.

As a related art to execute an accuracy adjustment of a machine tool, there is a method to use a laser measuring device. For example, a reflection target is installed on a moving table with a laser interference measuring device on a main spindle side, and errors at various positions are measured while operating a feed axis (see JP 2020-85704 A). Based on the measurement result, a correction amount is determined such that the errors at the various positions are reduced. When the machine tool is used, an accuracy adjustment of the machine tool is executed by correcting the position of the spindle based on the determined correction amount. Other than that, a level adjustment in which a level is installed on a table of the machine tool and a height of a foundation bolt of the machine tool is adjusted so as to be leveled has also been widely executed.

As a technique to diagnose an accuracy state of a machine tool, there also is a technique that diagnoses whether the machine tool is in a condition to have an increased accuracy change or not based on temperature information (see JP 2019-136846 A).

However, the method for measuring and adjusting an accuracy of a machine tool like JP 2020-85704 A takes time in measuring, especially in a large-sized machine tool. Therefore, it is necessary to plan a date and time to execute the measurement in advance for a machine used for production. By the reasons such as a measuring device being expensive and being hard to handle, it is conceivable that an accuracy adjustment is requested to a person responsible for executing the accuracy adjustment in many cases instead of a user of the machine executing the accuracy adjustment by himself/herself. In the case in particular, it is necessary to plan when the accuracy adjustment will be executed and adjust the schedule by request in advance.

For a method for finding a timing for the accuracy adjustment, it is conceivable to execute the accuracy adjustment when it is diagnosed that an accuracy change is large by using the diagnostic technique in JP 2019-136846 A. However, in the diagnostic technique in JP 2019-136846 A, while the current accuracy state can be diagnosed, it is not possible to predict a timing at which the future accuracy adjustment is to be required.

Therefore, it is an object of the disclosure to provide a technique that ensures predicting and preliminarily presenting a timing at which an accuracy adjustment of a machine tool is to be required.

Furthermore, it is an object of the disclosure to provide a system that ensures easily requesting the accuracy adjustment based on the prediction of the timing at which the accuracy adjustment is to be required.

SUMMARY

In order to achieve the above-described object, there is provided an accuracy diagnostic device for a machine tool according to a first aspect of the disclosure. The accuracy diagnostic device includes a change amount detecting unit, a change amount recording unit, an accuracy change predictor, and an accuracy adjustment timing presenting unit. The change amount detecting unit detects a magnitude of a change in at least one of a state of a machine tool and a surrounding environment of the machine tool as a change amount. The change amount recording unit records the change amount. The accuracy change predictor predicts a future accuracy change of the machine tool using the change amount recorded in the change amount recording unit. The accuracy adjustment timing presenting unit presents a timing at which an accuracy adjustment is to be required for the machine tool based on the accuracy change predicted by the accuracy change predictor.

In another aspect of the disclosure, which is in the above configuration, the accuracy change predictor predicts a future accuracy change of the machine tool using an accuracy change predicting formula formed by including a change amount dependent component that changes by the change amount and an elapsed time dependent component that changes by an elapsed time.

In another aspect of the disclosure, which is in the above configuration, the accuracy change predicting formula is represented by a formula including a periodic function.

In another aspect of the disclosure, which is in the above configuration, the accuracy change predicting formula is represented as a formula including a function that increases a magnitude of a predicted accuracy change as an elapsed time increases.

In another aspect of the disclosure, which is in the above configuration, the accuracy diagnostic device further includes an accuracy recording unit and an accuracy change predicting formula determining unit. The accuracy recording unit records a machine accuracy obtained by actually measuring an accuracy of the machine tool together with a measurement date and time. The accuracy change predicting formula determining unit determines an accuracy change predicting formula based on the machine accuracy and the measurement date and time recorded on the accuracy recording unit and the change amount recorded on the change amount recording unit. The accuracy change predictor predicts a future accuracy change of the machine tool using the accuracy change predicting formula determined by the accuracy change predicting formula determining unit.

In another aspect of the disclosure, which is in the above configuration, the change amount is at least one of a temperature of the machine tool and a temperature of the surrounding environment.

In another aspect of the disclosure, which is in the above configuration, the change amount is an inclination amount of the machine tool.

In another aspect of the disclosure, which is in the above configuration, the accuracy diagnostic device further includes a data communication unit configured to communicate data with an information terminal coupled via a communication line.

In another aspect of the disclosure, which is in the above configuration, the accuracy diagnostic device further includes an accuracy adjustment desired date and time determining unit configured to determine an accuracy adjustment desired date and time based on an accuracy adjustment timing presented by the accuracy adjustment timing presenting unit. The accuracy adjustment desired date and time determined by the accuracy adjustment desired date and time determining unit is transmittable to the information terminal by the data communication unit.

In another aspect of the disclosure, which is in the above configuration, the data communication unit is configured to obtain an accuracy adjustment executable date and time from the information terminal, the accuracy diagnostic device further includes an accuracy adjustment execution date and time determining unit that determines an accuracy adjustment execution date and time based on an accuracy adjustment timing presented by the accuracy adjustment timing presenting unit and the obtained accuracy adjustment executable date and time, and the accuracy adjustment execution date and time determined by the accuracy adjustment execution date and time determining unit is transmittable to the information terminal by the data communication unit.

In order to achieve the above-described object, there is provided an accuracy diagnostic method for a machine tool according to a second aspect of the disclosure. The accuracy diagnostic method includes a change amount detecting step of detecting a magnitude of a change in at least one of a state of a machine tool and a surrounding environment of the machine tool as a change amount. The method also includes a change amount recording step of recording the change amount and an accuracy change predicting step of predicting a future accuracy change of the machine tool using the change amount recorded at the change amount recording step. The method further includes an accuracy adjustment timing presenting step of presenting a timing at which an accuracy adjustment is to be required for the machine tool based on the accuracy change predicted at the accuracy change predicting step.

In order to achieve the above-described object, there is provided an accuracy adjustment reservation system for a machine tool according to a third aspect of the disclosure. The accuracy adjustment reservation system includes the above-described accuracy diagnostic device, an information terminal, and an accuracy adjustment reservation system server. The information terminal is coupled to a communication line. The accuracy adjustment reservation system server is coupled to the accuracy diagnostic device and the information terminal via the communication line. Furthermore, the accuracy adjustment reservation system server determining and reserving the accuracy adjustment execution date and time based on an accuracy adjustment timing presented by the accuracy adjustment timing presenting unit of the accuracy diagnostic device and the accuracy adjustment executable date and time obtained from the information terminal.

With the disclosure, the magnitude of the change in the state of the machine tool or the surrounding environment is detected and the future accuracy change of the machine tool is predicted to present the timing at which the accuracy adjustment is to be required, thereby allowing a user of the machine tool to plan the accuracy adjustment for maintaining the accuracy of the machine tool in advance.

In particular, disposing the server coupled to the machine tool and the information terminal ensures establishing the accuracy adjustment reservation system for the machine tool configured to deal with the accuracy adjustments of a plurality of the machine tools.

With another aspect of the disclosure, in addition to the above-described effects, using the accuracy change predicting formula formed of the change amount dependent component that changes by the change amount and the elapsed time dependent component that changes by the elapsed time ensures presenting the timing at which the accuracy adjustment is to be required at an appropriate frequency not only when the accuracy change is caused by the detectable factor, but also when the accuracy change is caused by an undetectable factor.

With another aspect of the disclosure, in addition to the above-described effects, since the accuracy change predicting formula is represented as a formula including the periodic function, for example, it is possible to predict the accuracy change as a change of one year period and present the timing at which the accuracy adjustment is to be required.

With another aspect of the disclosure, in addition to the above-described effects, since the accuracy change predicting formula is represented as a formula including the function that increases the accuracy change predicted as the elapsed time increases, the timing at which the accuracy adjustment is to be required is presentable at an appropriate frequency even when the accuracy change is caused by an undetectable factor.

With another aspect of the disclosure, in addition to the above-described effects, recording the measured machine accuracy of the machine tool together with the change amount and the date and time and determining the accuracy change predicting formula based on the data ensures an enhanced prediction accuracy of the accuracy change.

With another aspect of the disclosure, in addition to the above-described effects, detecting the temperature as the change amount ensures predicting the accuracy change caused by a temperature change.

With another aspect of the disclosure, in addition to the above-described effects, detecting the inclination as the change amount ensures predicting the accuracy change caused by an inclination change.

With another aspect of the disclosure, in addition to the above-described effects, including the data communication unit that communicates data with the information terminal coupled via the communication line ensures easily sharing information with outside.

With another aspect of the disclosure, in addition to the above-described effects, determining the accuracy adjustment desired date and time based on the presented accuracy adjustment timing and transmitting it via the communication line ensures easily requesting the accuracy adjustment to an executor of the accuracy adjustment.

With another aspect of the disclosure, in addition to the above-described effects, determining the accuracy adjustment execution date and time based further on the accuracy adjustment executable date and time obtained via the communication line ensures determining a day on which the accuracy adjustment is surely executable as an execution day.

DETAILED DESCRIPTION

The following describes embodiments of the disclosure based on the drawings.

Figure 1:
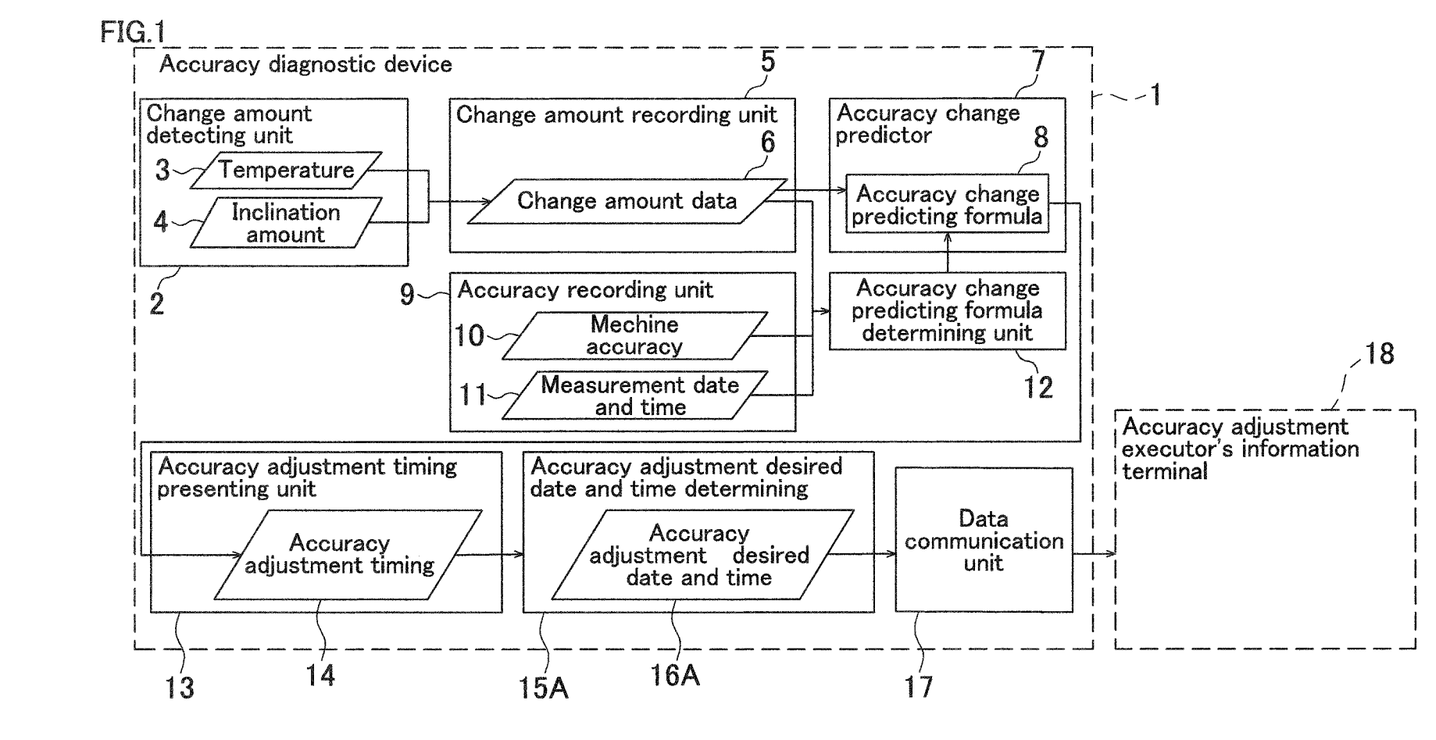
FIG. 1 is a block diagram of an accuracy diagnostic device that determines and transmits a desired date and time for an accuracy adjustment.

FIG. 1 is a drawing illustrating an exemplary configuration of an accuracy diagnostic device of the disclosure.

The accuracy diagnostic device 1 diagnoses an accuracy change of a machine tool by an accuracy diagnostic method described later, and presents a timing for an accuracy adjustment. As the accuracy change of the machine tool diagnosed in the disclosure, any index of accuracy change, such as a positioning accuracy, a straightness, and a squareness of each rectilinear axis and each rotation shaft of the machine tool, a runout of a main spindle and the rotation shaft, a flatness of a table, and a spatial error, can be an object. Not a single object, but a plurality of indexes of the above may be combined and used.

First, a change amount detecting unit 2 detects a magnitude of a change in a state of the machine tool or a surrounding environment as a change amount by various kinds of sensors installed in the machine tool (a change amount detecting step). In the example, a temperature 3 and an inclination amount 4 are detected by a temperature sensor and an inclination sensor, respectively, as the changes in the state.

Next, a change amount recording unit 5 records the detected change amount together with a time as change amount data 6 (a change amount recording step).

An accuracy change predictor 7 predicts an accuracy change by an accuracy change predicting formula 8 configured in advance (an accuracy change predicting step). For example, the accuracy change predicting formula 8 is represented as Formula 1 below.

[Math. 1]

$$\Delta X(t-t_0) = f(\theta(t)-\theta_0) + g(t-t_0) \quad \text{(Formula 1)}$$

t: time point at which prediction of accuracy change is desired $t_0$: base time point of accuracy change (time point at which previous accuracy adjustment was executed)

$\Delta X$: accuracy change $\theta(t)$: change amount at time point at which prediction of accuracy change is desired $\theta_0$: change amount at base time point of accuracy change f: function representing change amount dependent component that changes by change amount $\theta$ g: function representing elapsed time dependent component that changes by elapsed time $t-t_0$ Formula 1 calculates the change amount dependent component that changes by the change amount $\theta$ by the function f, calculates the elapsed time dependent component that changes by the elapsed time $t-t_0$ to by the function g, and calculates the accuracy change $\Delta X$ by adding them together.

The change amount dependent component allows the prediction of the accuracy change based on the change amount data 6. On the other hand, the function g representing the elapsed time dependent component is configured as a function that increases the predicted accuracy change as more time elapses. In view of this, it is diagnosed that an accuracy adjustment is to be required after a certain amount of time elapses even when the accuracy has changed by a factor other than the detected change amount, thereby ensuring maintaining the accuracy. However, the accuracy change $\Delta X$ may be calculated only by the change amount dependent component without using the elapsed time dependent component.

In Formula 1, the change amount at the time point at which the prediction of the accuracy change is desired is calculated by the function $\theta(t)$ of time. For example, when the change is predicted in one year period, the function $\theta(t)$ is represented as a periodic function like Formula 2 below.

[Math. 2]

$$\theta(t) = A + B\sin\left[\frac{2\pi}{T}(t+C)\right] \quad \text{(Formula 2)}$$

t: elapsed time
T: period (one year)
A, B, C: constant

The function $\theta(t)$ may be represented by a formula like Formula 2 or may be represented by a point cloud that corresponds to a relationship between the date and time and a numerical value of change amount. The period may be any period including, for example, one week period, instead of the one year period. The function $\theta(t)$ is preliminarily determined by, for example, fitting from data on the past change amount.

Furthermore, as a method for enhancing a prediction accuracy of the accuracy change predicting formula 8, a method that causes a learning using information on an actual machine accuracy change is conceivable. For that, a measured machine accuracy 10 and a measurement date and time 11 are recorded in an accuracy recording unit 9. Using the measured machine accuracy 10, the measurement date and time 11, and the change amount data 6 on the measurement date and time, the accuracy change predicting formula 8 is determined in an accuracy change predicting formula determining unit 12. For example, the function f and the function g are determined such that the value in Formula 3 below becomes the minimum using the least-square method.

However, the accuracy change predicting formula 8 may be determined by using a known parameter identification method or a machine learning method, instead of the least-square method in Formula 3.

[Math. 3]

$$\Sigma_{n=1}^{N}[f(\theta_n-\theta_{n-1})-\Delta X_{n,n-1}]^2 \quad \text{(Formula 3)}$$

Figure 4:
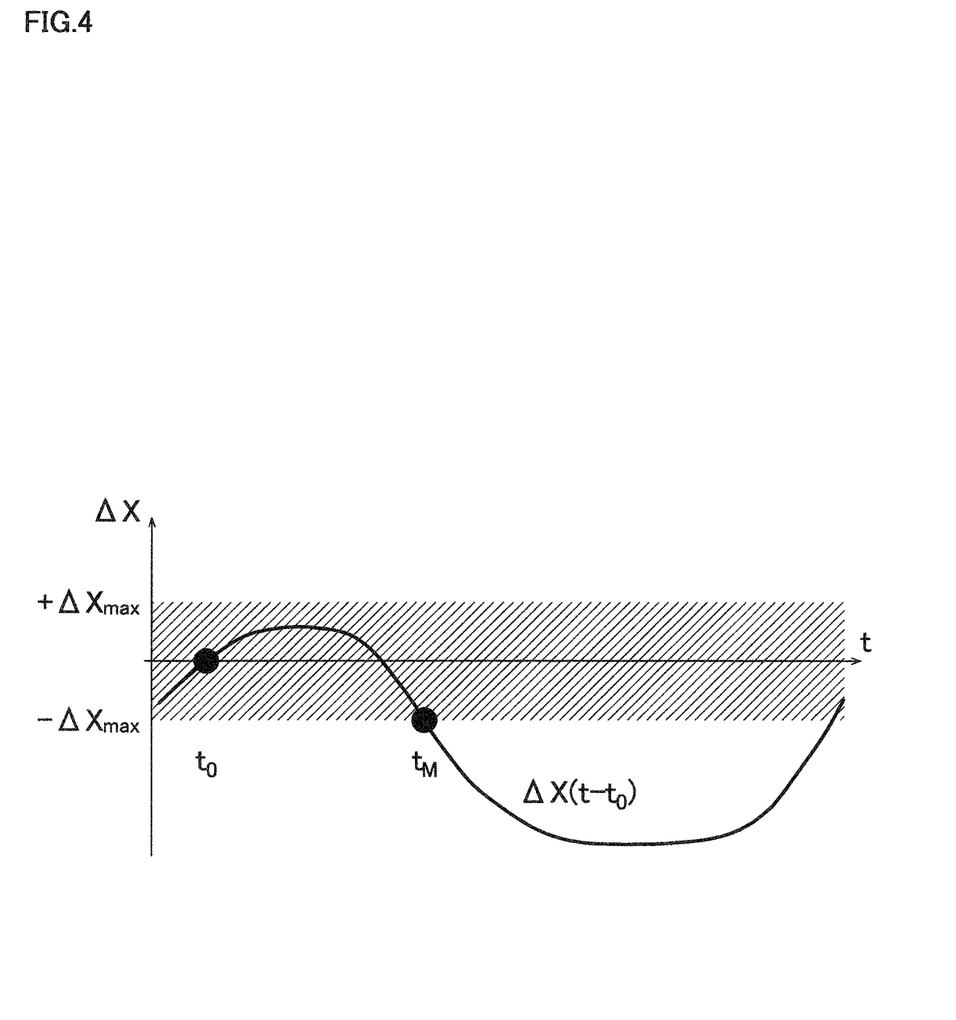
FIG. 4 is a drawing for describing a determination method for an accuracy adjustment timing.

$t_0, t_1, \ldots, t_N$: date and time when accuracy was measured $\theta_0, \theta_1, \ldots, \theta_N$: change amount on date and time when accuracy was measured $\Delta X_{n,n-1}$: measured accuracy change between to $t_{n-1}$ to $t_n$ Next, an accuracy adjustment timing presenting unit 13 predicts a timing at which the accuracy adjustment is to be required based on the accuracy change predicted by the accuracy change predictor 7, and determines and presents an accuracy adjustment timing 14 (an accuracy adjustment timing presenting step). For example, assume that the accuracy change $\Delta X(t-t_0)$ is predicted as in FIG. 4. At this time, a time point at which the absolute value of the accuracy change $\Delta X(t-t_0)$ from the base time point $t_0$ exceeds an acceptable value$\pm \Delta X_{max}$, that is, a time point out of the shaded region in FIG. 4 is presented as an accuracy adjustment timing $t_M$. The presentation of the accuracy adjustment timing 14 is executed by displaying on a display part (not illustrated) or transferring information by mail or the like. The value of the acceptable value$\pm \Delta X_{max}$ may be set by a user of the machine tool from the screen of the display part or the like. The accuracy adjustment timing 14 may be represented as a time period instead of a single time point.

Finally, an accuracy adjustment desired date and time determining unit 15A determines an accuracy adjustment desired date and time 16A based on the accuracy adjustment timing 14. The method for determining the accuracy adjustment desired date and time 16A may be automatically determining a date close to the date of the accuracy adjustment timing 14 by algorithm or may be displaying the accuracy adjustment timing 14 on the screen of the display part and inputting a convenient date with reference to the accuracy adjustment timing 14 by a user of the accuracy diagnostic device 1. Once the accuracy adjustment desired date and time 16A is determined, a data communication unit 17 transmits it to an external information terminal. In FIG. 1, it is transmitted to an information terminal (hereinafter simply referred to as an "information terminal") 18 of an accuracy adjustment executor. In view of this, the accuracy adjustment desired date and time can be easily informed. The external information terminal to be transmitted may be used as a server, and the information transmitted to the server may be checked by the accuracy adjustment executor.

The accuracy diagnostic device 1 in the above-described configuration includes the change amount detecting unit 2 that detects the temperature 3 and the inclination 4 (the magnitude of the change in the state) of the machine tool as the change amount data 6 (the change amount), the change amount recording unit 5 that records the change amount data 6, the accuracy change predictor 7 that predicts the future accuracy change of the machine tool using the change amount data 6 recorded in the change amount recording unit 5, and the accuracy adjustment timing presenting unit 13 that presents the accuracy adjustment timing 14 (the timing at which the accuracy adjustment is to be required) of the machine tool based on the accuracy change predicted by the accuracy change predictor 7, and executes the accuracy diagnostic method according to each of the above-described steps.

Thus, the magnitude of the change in the state of the machine tool is detected, and the future accuracy change of the machine tool is predicted based on the magnitude of the change to present the timing at which the accuracy adjustment is to be required, thereby allowing a user of the machine tool to preliminarily plan the accuracy adjustment for maintaining the accuracy of the machine tool.

In particular, the accuracy change predictor 7 uses the accuracy change predicting formula 8 formed by including the change amount dependent component that changes by the change amount data 6 and the elapsed time dependent component that changes by the elapsed time to predict the future accuracy change of the machine tool. Accordingly, the timing at which the accuracy adjustment is to be required can be presented at an appropriate frequency not only when the accuracy change is caused by a detectable factor, but also when the accuracy change is caused by an undetectable factor.

The accuracy change predicting formula 8 is represented as a formula including the periodic function. Accordingly, for example, it is possible to predict the accuracy change as a change of one year period and present the timing at which the accuracy adjustment is to be required.

The accuracy change predicting formula 8 is represented as (Formula 1) that includes the function g that increases the magnitude of the predicted accuracy change as the elapsed time increases. Accordingly, even when the accuracy change is caused by an undetectable factor, it is possible to present the timing at which the accuracy adjustment is to be required at an appropriate frequency.

The accuracy diagnostic device 1 further includes the accuracy recording unit 9 that records the machine accuracy 10 obtained by actually measuring the accuracy of the machine tool together with the measurement date and time 11. In addition, the accuracy diagnostic device 1 includes the accuracy change predicting formula determining unit 12 that determines the accuracy change predicting formula 8 based on the machine accuracy 10 and the measurement date and time 11 recorded in the accuracy recording unit 9 and the change amount data 6 recorded in the change amount recording unit 5. The accuracy change predictor 7 predicts the future accuracy change of the machine tool using the accuracy change predicting formula 8 determined by the accuracy change predicting formula determining unit 12.

Accordingly, the measured machine accuracy 10 of the machine tool is recorded together with the change amount data 6 and the measurement date and time 11, and the accuracy change predicting formula 8 is determined based on the data, thereby ensuring an enhanced prediction accuracy of the accuracy change.

The change amount data 6 is the temperature 3 of the machine tool. Accordingly, the accuracy change caused by the temperature change is predictable.

The change amount data 6 is the inclination amount 4 of the machine tool. Accordingly, the accuracy change caused by the inclination change is predictable.

Furthermore, the accuracy diagnostic device 1 includes the data communication unit 17 that can communicate data with the information terminal 18 coupled via a communication line. Accordingly, the information is possible to be easily shared with outside.

Moreover, the accuracy diagnostic device 1 includes the accuracy adjustment desired date and time determining unit 15A configured to determine the accuracy adjustment desired date and time 16A based on the accuracy adjustment timing 14 presented by the accuracy adjustment timing presenting unit 13. The accuracy adjustment desired date and time 16A determined by the accuracy adjustment desired date and time determining unit 15A is transmittable to the information terminal 18 by the data communication unit 17.

Accordingly, the accuracy adjustment is easily requestable to an executor of the accuracy adjustment.

The following describes a modification example of the disclosure.

Figure 2:
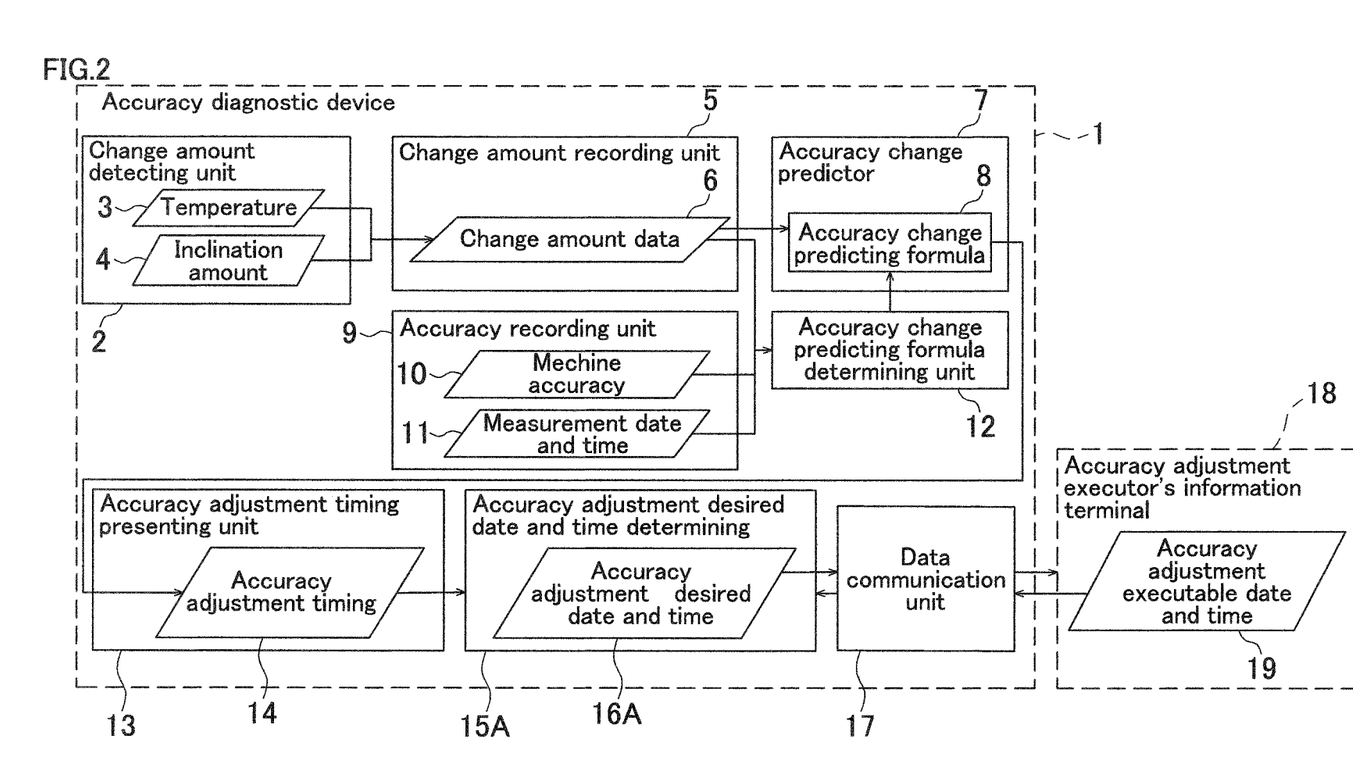
FIG. 2 is a block diagram of an accuracy diagnostic device that obtains an executable date and time for the accuracy adjustment, and determines and transmits an execution date and time for the accuracy adjustment.

FIG. 2 is illustrated as another example of a communication with outside. FIG. 2 is a block diagram of when an accuracy adjustment executable date and time is obtained from outside, and determines and transmits an accuracy adjustment execution date and time based on the accuracy adjustment timing 14 and the accuracy adjustment executable date and time.

Figure 5:
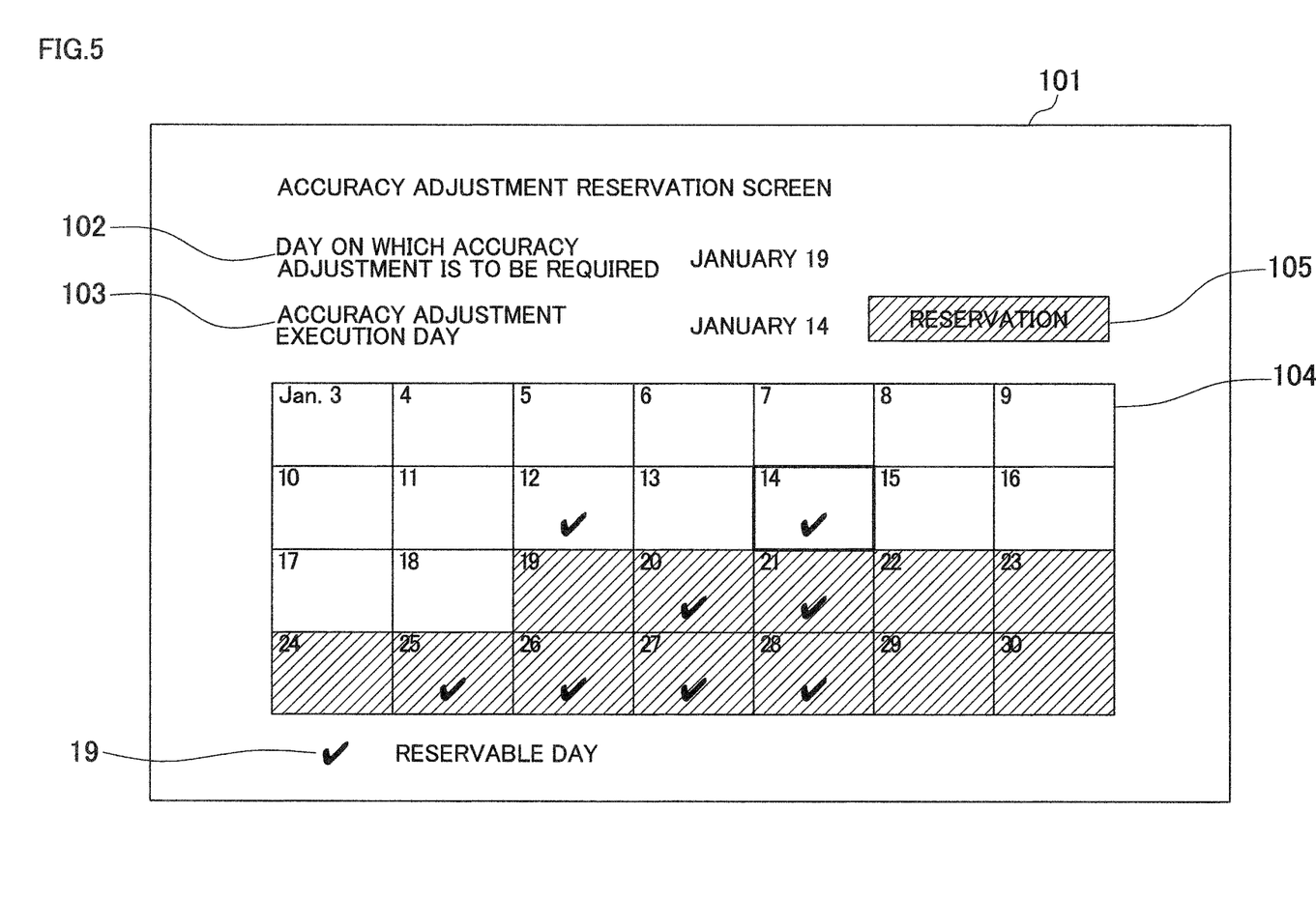
FIG. 5 is an exemplary screen displayed on a display part.

Reference numerals 1 to 14 have the same configurations as those of FIG. 1, and the accuracy adjustment timing 14 is determined. In FIG. 2, unlike FIG. 1, an accuracy adjustment executable date and time 19 is obtained from the information terminal 18 via the data communication unit 17. An accuracy adjustment execution date and time determining unit 15B determines an accuracy adjustment execution date and time 16B based on the accuracy adjustment timing 14 and the accuracy adjustment executable date and time 19. A method for determining the accuracy adjustment execution date and time 16B may be automatically determining a date close to the date of the accuracy adjustment timing 14 from the accuracy adjustment executable dates and times 19 by algorithm. Alternatively, the method may be displaying the accuracy adjustment timing and the accuracy adjustment executable dates and times on the screen of the display part as illustrated in FIG. 5 and inputting a convenient date with reference to the accuracy adjustment timing and the accuracy adjustment executable dates and times on the screen by a user of the accuracy diagnostic device 1. The display content in FIG. 5 will be described later. Once the accuracy adjustment execution date and time 16B is determined, the data communication unit 17 transmits it to the information terminal 18. In view of this, the reservation of the accuracy adjustment execution is confirmed.

Thus, the data communication unit 17 is configured to obtain the accuracy adjustment executable date and time 19 from the information terminal 18. The date communication unit 17 further includes the accuracy adjustment execution date and time determining unit 15B that determines the accuracy adjustment execution date and time 16B based on the accuracy adjustment timing 14 presented by the accuracy adjustment timing presenting unit 13 and the obtained accuracy adjustment executable date and time 19. The accuracy adjustment execution date and time 16B determined by the accuracy adjustment execution date and time determining unit 15B is transmittable to the information terminal 18 by the data communication unit 17.

Accordingly, it is possible to determine a day on which the accuracy adjustment is surely executable as the execution day.

Figure 3:
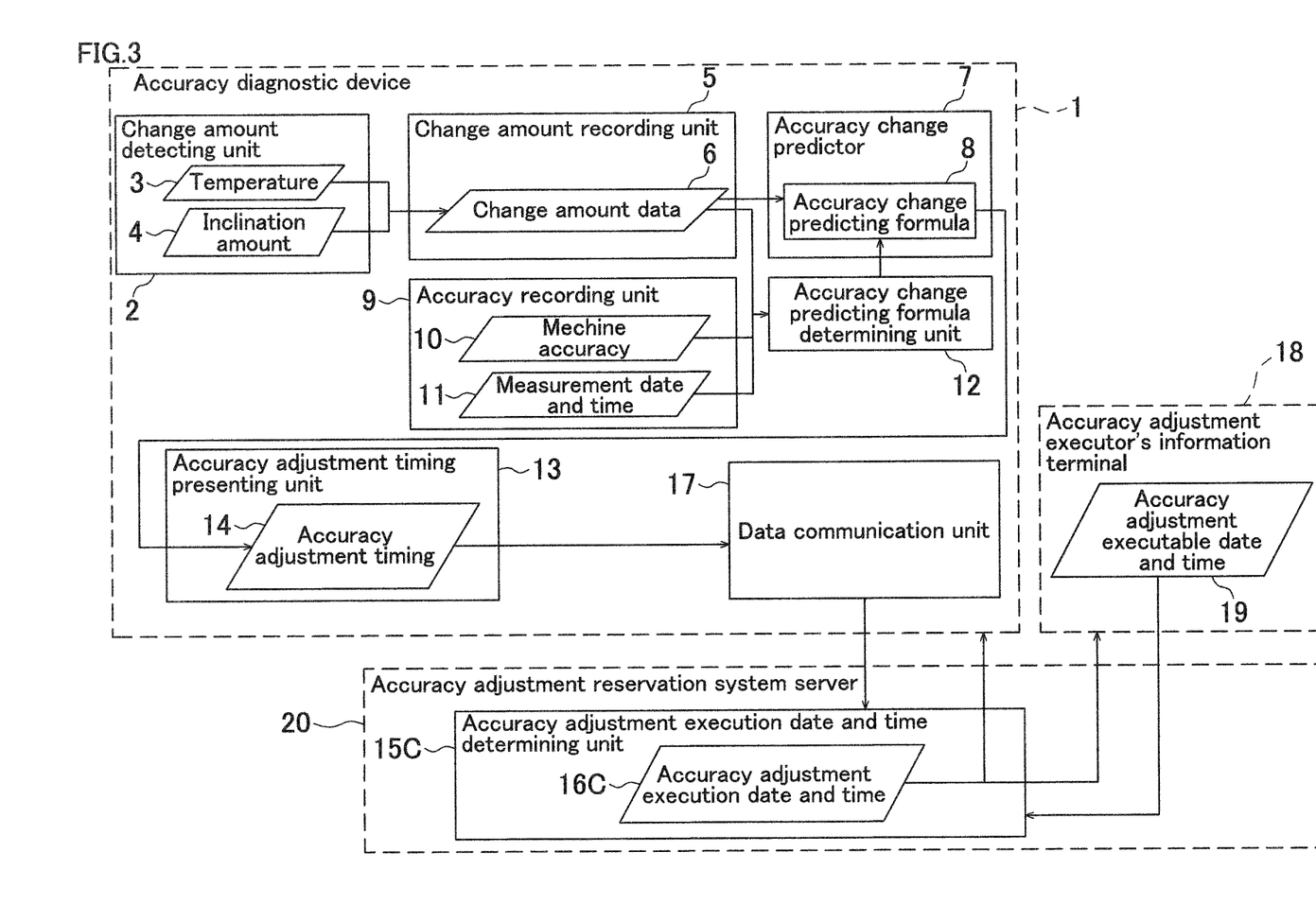
FIG. 3 is a block diagram of an accuracy adjustment reservation system that determines and transmits the execution date and time for the accuracy adjustment in an accuracy adjustment reservation system server.

FIG. 3 is illustrated as yet another example of the communication with outside. FIG. 3 is a block diagram of the accuracy adjustment reservation system of when an accuracy adjustment reservation system server (hereinafter simply referred to as a "server") 20 determines and transmits the accuracy adjustment execution date and time.

The reference numerals 1 to 14 have the same configurations as those of FIG. 1 and FIG. 2, and the accuracy adjustment timing 14 is determined. The accuracy adjustment timing 14 is transmitted to an accuracy adjustment execution date and time determining unit 15C disposed in the server 20 as data via the data communication unit 17. Similarly, from the information terminal 18, the data of the accuracy adjustment executable date and time 19 is transmitted to the accuracy adjustment execution date and time determining unit 15C. The accuracy adjustment execution date and time determining unit 15C determines an accuracy adjustment execution date and time 16C based on the information. A method for determining the accuracy adjustment execution date and time 16C may be automatically determining a date close to the date of the accuracy adjustment timing 14 from the accuracy adjustment executable dates and times 19 by algorithm. Alternatively, the method may be displaying the accuracy adjustment timing and the accuracy adjustment executable dates and times on the screen illustrated in FIG. 5 and inputting a convenient date with reference to the accuracy adjustment timing and the accuracy adjustment executable dates and times by a user of the accuracy diagnostic device 1.

Additionally, the server 20 transmits the determined accuracy adjustment execution date and time 16C to each of the accuracy diagnostic device 1 and the information terminal 18. In view of this, the reservation of the accuracy adjustment execution is confirmed. At this time, the accuracy adjustment date and time may be directly notified to a user by mail or the like. Furthermore, a user and an accuracy adjustment executor of the accuracy diagnostic device 1 for the machine tool may have respective accounts so that the accuracy adjustment date and time can be confirmed on the screen displayed by logging in the server 20.

Thus, the above-described accuracy adjustment reservation system includes the accuracy diagnostic device 1, the information terminal 18 coupled to the communication line, and the server 20 that is coupled to the accuracy diagnostic device 1 and the information terminal 18 via the communication line. The server 20 determines and reserves the accuracy adjustment execution date and time 16C based on the accuracy adjustment timing 14 presented by the accuracy adjustment timing presenting unit 13 of the accuracy diagnostic device 1 and the accuracy adjustment executable date and time 19 obtained from the information terminal 18.

Accordingly, the accuracy adjustment reservation system for the machine tool configured to deal with accuracy adjustments of a plurality of the machine tools can be established.

Next, FIG. 5 illustrates an exemplary screen that presents a display with the accuracy adjustment execution date and time determining units 15B and 15C. On an accuracy adjustment reservation screen 101, a day 102 on which an accuracy adjustment is to be required, an accuracy adjustment execution day 103, a calendar 104 that displays dates, and a reservation button 105 are displayed. First, the day 102 on which the accuracy adjustment is to be required is displayed based on the accuracy adjustment timing 14, and a period during which the accuracy adjustment is to be required is displayed in a shade on the calendar 104. On the calendar 104, reservable days, that is, the accuracy adjustment executable dates and times 19 are displayed with "✓". A user of the accuracy diagnostic device 1 can select the accuracy adjustment execution day 103 by considering the reservable days 19 and the day 102 on which the accuracy adjustment is to be required. In the example, the day on which the accuracy adjustment is to be required is predicted as January 19, and January 14 as the reservable day, which is a date before January 19, is selected as the accuracy adjustment execution day. After the accuracy adjustment execution day 103 is determined, it is transmitted to the information terminal 18 and the server 20 by pressing the reservation button 105, thus ensuring the reservation of the accuracy adjustment.

Other than that, in each example described above, while the temperature of the machine tool is detected and recorded as the change amount data, a temperature of the surrounding environment of the machine tool may be used as the change amount data. Both the temperatures of the machine tool and the surrounding environment may be used as the change amount data.

The accuracy recording unit may be omitted, and the accuracy change predictor may predict the accuracy change based only on the change amount data.

The accuracy adjustment execution date and time determining unit and the data communication unit may be omitted, and the display part disposed on the accuracy diagnostic device may merely display the accuracy adjustment desired date and time and the accuracy adjustment execution date and time.

The accuracy diagnostic device may be formed of an NC device of the machine tool or may be formed of an external device communicative with the NC device.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. An accuracy diagnostic device for a machine tool, comprising:
    a change amount detecting unit that detects a magnitude of a change in at least one of a state of a machine tool and a surrounding environment of the machine tool as a change amount;
    a change amount recording unit that records the change amount;
    an accuracy change predictor that predicts a future accuracy change of the machine tool using the change amount recorded in the change amount recording unit;
    an accuracy adjustment timing presenting unit that presents a time point at which an absolute value of an accuracy change predicted from a base time point deviates from an acceptable value as a timing at which an accuracy adjustment is to be required for the machine tool based on the accuracy change predicted by the accuracy change predictor, the base time point and the acceptable value;
    an accuracy recording unit that records a machine accuracy obtained by actually measuring an accuracy of the machine tool together with a measurement date and time; and
    an accuracy change predicting formula determining unit that determines an accuracy change predicting formula based on the machine accuracy and the measurement date and time recorded on the accuracy recording unit and the change amount recorded on the change amount recording unit,
    wherein the accuracy change predictor predicts a future accuracy change of the machine tool using the accuracy change predicting formula determined by the accuracy change predicting formula determining unit, and
    wherein (i) the accuracy change predicting formula is formed by including a change amount dependent component that changes by the change amount and an elapsed time dependent component that changes by an elapsed time; (ii) a change amount of the change amount dependent component in the accuracy change predicting formula is represented by a formula including a periodic function; and (iii) the change amount dependent component in the accuracy change predicting formula is represented as a formula including a function that increases a magnitude of a predicted accuracy change as an elapsed time increases.

2. The accuracy diagnostic device according to claim 1, wherein the change amount is at least one of a temperature of the machine tool and a temperature of the surrounding environment.

3. The accuracy diagnostic device according to claim 1, wherein
    the change amount is an inclination amount of the machine tool.

4. The accuracy diagnostic device according to claim 1, further comprising
    a data communication unit configured to communicate data with an information terminal coupled via a communication line.

5. The accuracy diagnostic device according to claim 4, further comprising
    an accuracy adjustment desired date and time determining unit configured to determine an accuracy adjustment desired date and time based on an accuracy adjustment timing presented by the accuracy adjustment timing presenting unit, wherein
    the accuracy adjustment desired date and time determined by the accuracy adjustment desired date and time determining unit is transmittable to the information terminal by the data communication unit.

6. The accuracy diagnostic device according to claim 4, wherein
    the data communication unit is configured to obtain an accuracy adjustment executable date and time from the information terminal, wherein
    the accuracy diagnostic device further comprises an accuracy adjustment execution date and time determining unit that determines an accuracy adjustment execution date and time based on an accuracy adjustment timing presented by the accuracy adjustment timing presenting unit and the obtained accuracy adjustment executable date and time, and
    the accuracy adjustment execution date and time determined by the accuracy adjustment execution date and time determining unit is transmittable to the information terminal by the data communication unit.

7. An accuracy diagnostic method for a machine tool, comprising:
    detecting a magnitude of a change in at least one of a state of a machine tool and a surrounding environment of the machine tool as a change amount;
    recording the change amount;
    predicting a future accuracy change of the machine tool using the change amount recorded at the recording; and
    presenting a time point at which an absolute value of an accuracy change predicted from a base time point deviates from an acceptable value as a timing at which an accuracy adjustment is to be required for the machine tool based on the accuracy change predicted at the predicting, the base time point and the acceptable value;
    recording a machine accuracy obtained by actually measuring an accuracy of the machine tool together with a measurement date and time;
    determining an accuracy change predicting formula based on the machine accuracy, the measurement date and time recorded, and the change amount recorded; and
    predicting the future accuracy change of the machine tool using the determined accuracy change predicting formula determined;
    wherein (i) the determined accuracy change predicting formula is formed by including a change amount dependent component that changes by the change amount and an elapsed time dependent component that changes by an elapsed time: (ii) a change amount of the change amount dependent component in the accuracy change predicting formula is represented by a formula including a periodic function; and (iii) the change amount dependent component in the accuracy change predicting formula is represented as a formula including a function that increases a magnitude of a predicted accuracy change as an elapsed time increases.

8. An accuracy adjustment reservation system for a machine tool, comprising:
the accuracy diagnostic device according to claim 4;
an information terminal coupled to a communication line; and
an accuracy adjustment reservation system server coupled to the accuracy diagnostic device and the information terminal via the communication line, the accuracy adjustment reservation system server determining and reserving the accuracy adjustment execution date and time based on an accuracy adjustment timing presented by the accuracy adjustment timing presenting unit of the accuracy diagnostic device and the accuracy adjustment executable date and time obtained from the information terminal.

* * * * *